United States Patent
Yi et al.

(10) Patent No.: US 9,521,677 B2
(45) Date of Patent: Dec. 13, 2016

(54) METHODS AND APPARATUSES FOR ALLOCATION OF RESOURCE BLOCKS

(75) Inventors: Su Yi, Beijing (CN); Ming Lei, Beijing (CN); Shaoyi Xu, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 126 days.

(21) Appl. No.: 14/345,134

(22) PCT Filed: Mar. 29, 2012

(86) PCT No.: PCT/CN2012/073233
§ 371 (c)(1),
(2), (4) Date: Sep. 4, 2014

(87) PCT Pub. No.: WO2013/143098
PCT Pub. Date: Oct. 3, 2013

(65) Prior Publication Data
US 2014/0378154 A1    Dec. 25, 2014

(51) Int. Cl.
*H04W 36/00*    (2009.01)
*H04W 72/04*    (2009.01)
(Continued)

(52) U.S. Cl.
CPC .......... *H04W 72/048* (2013.01); *H04W 28/26* (2013.01); *H04W 72/082* (2013.01); *H04W 84/005* (2013.01)

(58) Field of Classification Search
CPC ... H04W 16/00–16/16; H04W 28/00–28/0284; H04W 28/16; H04W 64/00–64/006; H04W 76/046; H04W 84/00; H04W 84/005; H04W 84/045–84/06; H04W 84/105; H04W 88/00; H04W 88/08–88/182; H04W 24/10; H04W 72/0453
See application file for complete search history.

(56) References Cited

U.S. PATENT DOCUMENTS

| | | | |
|---|---|---|---|
| 2009/0186645 A1 | 7/2009 | Jaturong et al. | |
| 2010/0118827 A1* | 5/2010 | Sundaresan ........... | H04W 72/04 370/330 |

(Continued)

FOREIGN PATENT DOCUMENTS

| | | | |
|---|---|---|---|
| CN | 101106794 A | | 1/2008 |
| CN | 101365242 A | | 2/2009 |
| CN | 101980458 A | * | 2/2011 |

OTHER PUBLICATIONS

International Search Report of PCT/CN2012/073233, dated Jan. 10, 2013.

*Primary Examiner* — Dung Hong
(74) *Attorney, Agent, or Firm* — Sughrue Mion, PLLC (57) ABSTRACT

Provided are methods and corresponding apparatuses for allocation of resource blocks. A method for allocation of resource blocks comprises receiving, from a base station, information regarding a measurement location at which at least one identified resource block has been measured; and using, based upon a current location of a mobile relay node and the measurement location, the at least one identified resource block for communication between the mobile relay node and at least one user equipment connected therewith, wherein the at least one identified resource block is not used for communication between the base station and at least one user equipment connected therewith at the measurement location and a measurement of the at least one identified resource block is below a predetermined threshold. With the claimed inventions, interference in the high speed railway communication could be ameliorated and the spectrum efficiency would be improved.

22 Claims, 5 Drawing Sheets

(51) Int. Cl.
*H04W 28/26* (2009.01)
*H04W 72/08* (2009.01)
*H04W 84/00* (2009.01)

(56) References Cited

U.S. PATENT DOCUMENTS

| | | | | |
|---|---|---|---|---|
| 2011/0110345 A1* | 5/2011 | Heidari | .................. | H04W 40/06 |
| | | | | 370/338 |
| 2012/0307715 A1* | 12/2012 | Maeda | .................... | H04L 5/001 |
| | | | | 370/315 |
| 2013/0223257 A1* | 8/2013 | Balercia | ............. | H04B 7/15557 |
| | | | | 370/252 |

* cited by examiner

METHODS AND APPARATUSES FOR ALLOCATION OF RESOURCE BLOCKS

FIELD OF THE INVENTION

Embodiments of the present invention generally relate to wireless communication techniques including the 3GPP (the 3rd Generation Partnership Project) LTE (Long Term Evolution) technique. More particularly, embodiments of the present invention relate to methods and apparatuses for allocation of resource blocks.

BACKGROUND OF THE INVENTION

Various abbreviations that appear in the specification and/or in the drawing figures are defined as below:
BS Base Station
BCH Broadcast Channel
BRB Bad Resource Block
DL Downlink
DSP Digital Signal Processor
eNB evolved Node B
FDD Frequency Division Duplex
HST High Speed Train
HSR High Speed Railway
HUE HSR User Equipment
MUE Macro User Equipment
MeNB Macro evolved Node B
MR Mobile Relay
PDA Personal Digital Assistance
QoS Quality of Service
RB Resource Block
RNTI Radio Network Temporary Identifier
RRM Radio Resource Management
TD Time Division
TDD Time Division Duplex With current rapid developments of HSR vehicles (e.g., an HST), research on how to efficiently implement wireless communication around and within the HSR vehicle has become a hot point. For a communication scenario involving the HSR vehicle, possible communication architectures are exemplarily illustrated in FIGS. 1 and 2, as will be discussed below.

Figure 1:
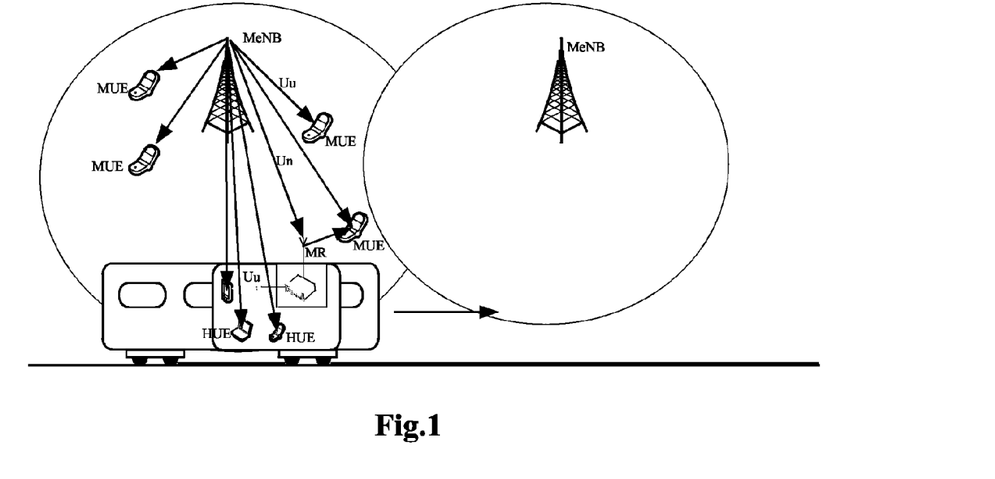
FIG. 1 illustrates DL transmission in a communication architecture in which embodiments of the present invention may be practiced.

As illustrated in FIG. 1, an HST, in which a plurality of HUEs (e.g., handsets or mobile computers) and an MR (node) are located, is traveling upon rail tracks whose respective sections may be covered by one or more BSs (i.e., MeNBs), as shown by two. When the HST runs into the coverage of the MeNB, in the DL transmission, HUEs may receive the signals transmitted from the MR and meanwhile MUEs may receive the signals transmitted from the MeNB, as illustrated in arrows. However, interference on the HUEs may arise when the signals transmitted in the DL direction from the MeNB penetrate into a carriage of the HST where the HUEs and the MR have been located. In other words, the MeNB nearby the HST may interfere with the HUEs in the DL transmission. Similarly, the MR may also interfere with the MUEs outside and in proximity to the HST in the DL transmission.

Figure 2:
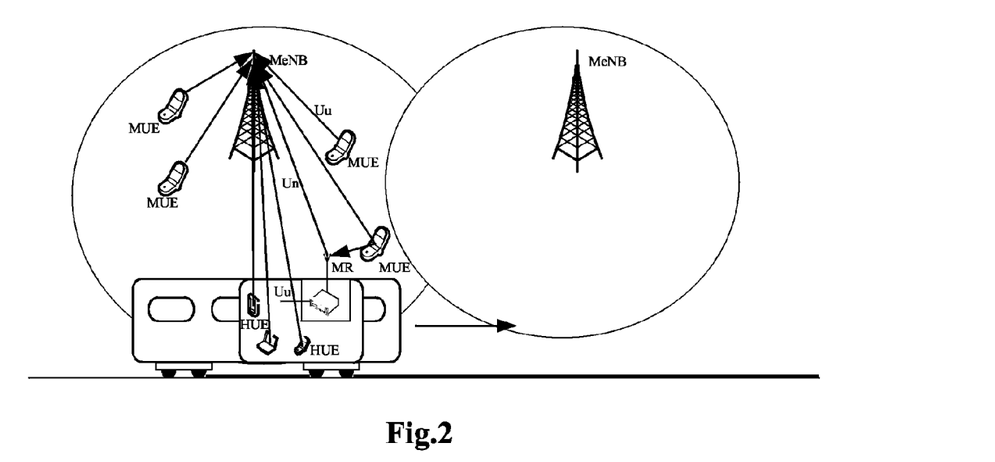
FIG. 2 illustrates UL transmission in a communication architecture in which embodiments of the present invention may be practiced.

FIG. 2 illustrates identical elements to the FIG. 1, except for a reverse transmission direct, i.e., the UL direct. In the UL transmission, the signals transmitted from the HUEs to the MR may interfere with the MeNB and meanwhile the signals transmitted from the MUEs to the MeNB may also interfere with the MR.

The interference as illustrated and discussed in connection with FIGS. 1 and 2 would adversely impact the HSR communication and further degrade the performance of the whole system. For instance, if the HST shares a same frequency with the TD-LTE system, the interference would become complicated or severe when the TD-LTE MeNBs are deployed on a large scale.

In view of the above, it would be desirable to alleviate or even eliminate the above interference without introducing significant changes to the existing communication architecture.

SUMMARY OF THE INVENTION

Therefore, there is a need in the art to provide for an efficient way of allocating RBs to be maintained and utilized between the MeNB and MR such that the interferences as discussed above could be restrained together with better spectrum efficiency.

In an exemplary embodiment of the present invention, a method for allocation of resource blocks is provided, which comprises receiving, from a BS, information regarding a measurement location at which at least one identified RB has been measured. The method also comprises using, based upon a current location of an MR node and the measurement location, the at least one identified RB for communication between the MR node and at least one UE connected therewith, wherein the at least one identified RB is not used for communication between the BS and at least one UE connected therewith at the measurement location and a measurement of the at least one identified RB is below a predetermined threshold.

In one embodiment, the using comprises using the at least one identified RB if a distance between the current location of the MR node and the measurement location is within a predetermined distance.

In another embodiment, the MR node and the at least one UE connected therewith are located in an HSR vehicle and the measurement location is in proximity to a rail track which is covered by the BS and upon which the HSR vehicle travels.

In an additional embodiment, the method comprises sending, prior to the receiving, a request to the BS for a needed number of the RBs which is determined by the MR node based upon QoS of the at least one UE connected therewith.

In a further embodiment, the at least one identified RB is used by the MR node other than the BS for UL transmission or is used by the MR node other than the BS for DL transmission.

In another exemplary embodiment of the present invention, a method for communication is provided, which comprises obtaining, at a BS, information regarding a measurement location at which at least one identified RB has been measured. The method also comprises sending the information to an MR node for communication between the MR node and at least one UE connected therewith, wherein the at least one identified RB is not used for communication between the BS and at least one UE connected therewith at the measurement location and a measurement of the at least one identified RB is below a predetermined threshold.

In another embodiment, the obtaining the information comprises receiving the information from the at least one UE connected with the BS or at least one deployed sensor in proximity to a rail track which is covered by the BS and upon which an HSR vehicle travels, and the MR node and the at least one UE connected therewith are within the HSR vehicle.

In an additional embodiment, the obtaining the information comprises receiving, at the BS, a reference signal and location information of the at least one UE connected with the BS and in proximity to a rail track which is covered by the BS and upon which an HSR vehicle travels; performing, based upon the received reference signal, a channel measurement throughout UL system bandwidth; determining, based upon the channel measurement, the at least one identified RB which is below the predetermined threshold; and sending the information to the MR node for UL transmission between the MR node and the at least one UE connected therewith.

In a further embodiment, a number of the RBs is preset or determined according to a request from the MR node.

In yet another embodiment, the method further comprises allocating, if the number of the RBs is less than as requested by the MR node, to the MR node one or more RBs that are orthogonal to the BS.

In a further embodiment, the at least one identified RB is used by the MR node other than the BS for UL transmission or is used by the MR node other than the BS for DL transmission.

In an additional exemplary embodiment of the present invention, an apparatus for allocation of resource blocks is provided, which comprises means for receiving, from a BS, information regarding a measurement location at which at least one identified RB has been measured. The apparatus also comprises means for using, based upon a current location of an MR node and the measurement location, the at least one identified RB for communication between the MR node and at least one UE connected therewith, wherein the at least one identified RB is not used for communication between the BS and at least one UE connected therewith at the measurement location and a measurement of the at least one identified RB is below a predetermined threshold.

In a further exemplary embodiment of the present invention, an apparatus for allocation of resource blocks is provided, which comprises means for obtaining, at a BS, information regarding a measurement location at which at least one identified RB has been measured. The apparatus also comprises means for sending the information to an MR node for communication between the MR node and at least one UE connected therewith, wherein the at least one identified RB is not used for communication between the BS and at least one UE connected therewith at the measurement location and a measurement of the at least one identified RB is below a predetermined threshold.

In one exemplary embodiment of the present invention, an apparatus for allocation of resource blocks is provided, which comprises at least one processor and at least one memory including computer program code. The memory and the computer program code are configured to cause the apparatus at least to receive, from a BS, information regarding a measurement location at which at least one identified RB has been measured. The memory and the computer program code are also configured to cause the apparatus at least to use, based upon a current location of an MR node and the measurement location, the at least one identified RB for communication between the MR node and at least one UE connected therewith, wherein the at least one identified RB is not used for communication between the BS and at least one UE connected therewith at the measurement location and a measurement of the at least one identified RB is below a predetermined threshold.

In another exemplary embodiment of the present invention, an apparatus for communication is provided, which comprises at least one processor and at least one memory including computer program code. The memory and the computer program code are configured to cause the apparatus at least to obtain, at a BS, information regarding a measurement location at which at least one identified RB has been measured. The memory and the computer program code are also configured to cause the apparatus at least to send the information to an MR node for communication between the MR node and at least one UE connected therewith, wherein the at least one identified RB is not used for communication between the BS and at least one UE connected therewith at the measurement location and a measurement of the at least one identified RB is below a predetermined threshold.

According to certain embodiments of the present invention, by proper allocation of RBs, the interference would be avoided effectively and the system performance can be improved. Further, given that detection of the channel state throughout the whole system bandwidth can be implemented by prior art techniques such as the LTE technique, it is unnecessary to impose other unavailable or additional function requirements on the current system.

Additionally, because the MUEs which are far away from the MR are capable of reusing the BRBs with the MR and HUEs, the allocation as proposed by the embodiments of the present invention is not an absolute orthogonal resource allocation and thereby flexibility and efficiency for use of the spectrum resources would be ameliorated.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The embodiments of the invention that are presented in the sense of examples and their advantages are explained in greater detail below with reference to the accompanying drawings, in which.

DETAILED DESCRIPTION OF EMBODIMENTS

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a," "an" and "the" are not intended to refer to only a singular entity, but include the general class of which a specific example may be used for illustration. The terminology herein is used to describe specific embodiments of the invention, but their usage does not delimit the invention. For example, a BS in the present invention may refer to one of a NB, an eNB, a base transceiver station, a radio BS, and the like and thus they may be used interchangeably throughout the specification and claims as appropriate.

Embodiments of the present invention propose an efficient mechanism of avoiding the DL and UL interference in an HSR environment in which an MR is used to relay the data between the MeNB and the HUE in an HST. By assistance of the MUEs which are close to the HSR in determining which RBs are BRBs, the MeNB would schedule its transmission not to use these BRBs and leave these BRBs for use by the MR. Because the MeNB and MUEs utilize different RBs from the MR and HUEs, the interference that may occur between the MeNB and HUEs and between the MR and MUEs can be avoided.

Embodiments of the present invention will be described in connection with the drawings in detail as below.

FIGS. 1 and 2 illustrate DL and UL transmission in communication architectures in which embodiments of the present invention may be practiced. Because discussions in regards to both FIGS. 1 and 2 have been made previously and thus their further descriptions are omitted herein for simplicity.

Figure 3:
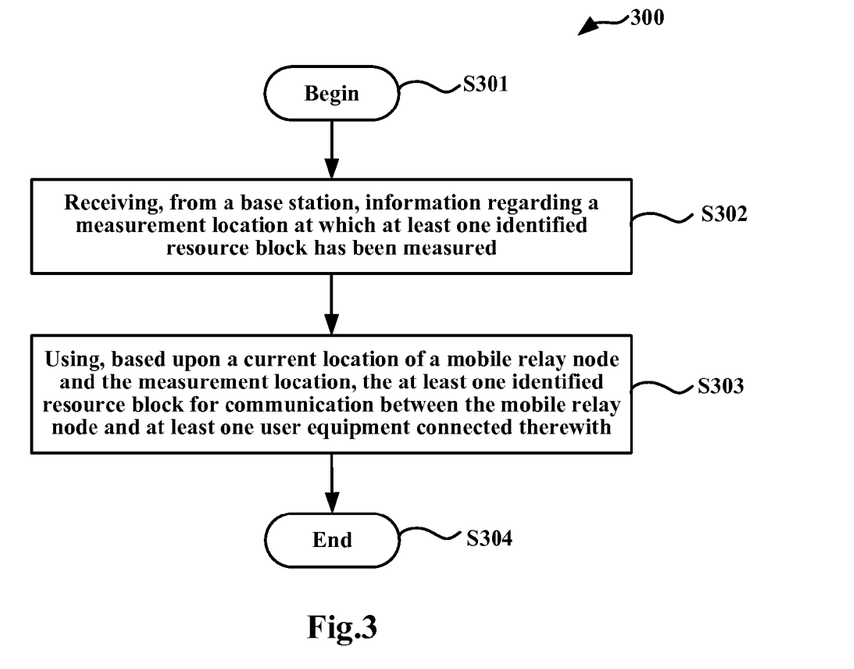
FIG. 3 is a flow chart schematically illustrating a method for allocation of RBs from an MR node perspective according to an embodiment of the present invention.

FIG. 3 is a flow chart schematically illustrating a method 300 for allocation of RBs from an MR node perspective according to an embodiment of the present invention. As illustrated in FIG. 3, the method 300 begins at step S301 and proceeds to step S302 at which the method 300 receives, from a BS, information regarding a measurement location at which at least one identified RB has been measured. The identified RB may be embodied as a physical RB in an LTE or LTE-Advanced system, such as numbered RB 1, RB 2, ..., and so on. Upon receipt of the information from the BS, the method 300 advances to step S303, at which the method 300 uses, based upon a current location of an MR node and the measurement location, the at least one identified RB for communication between the MR node and at least one UE connected therewith. Finally, the method 300 ends at step S304. Although not illustrated, the at least one identified RB is not used for communication between the BS and at least one UE connected therewith at the measurement location and a measurement of the at least one identified RB is below a predetermined threshold.

The measurement as mentioned above can be implemented by MUEs, which are close to the HST and preferably in idle states, based upon the instructions from the above BS (i.e., MeNB). Because the HSR is stationary, its location information (e.g., coordinates of each section of the rail tracks) can be provided to the MeNB before hand. Then, the MeNB may apprise all MUEs of the location information via BCH signaling. According to the location information at issue, the MUEs may determine whether they are close to the HSR or not by taking their current position into account. In view of the fact that GPS-enabled UEs are very common now, it is easy for the UE to determine its own current position and make a judgment regarding whether it is sufficiently close to the HSR. For example, if the MUE finds itself within the predetermined scope of 20 meters from the rail track upon which the MR node would travel in a very near future, it will measure the channel state of the whole system bandwidth at its position. The channel state may be characterized by e.g., measured power of the signal received on one RB. If the measured power of an RB is below a predetermined threshold, then the RB would be deemed by the MUE as a BRB and it should only be used by the MR node when it arrives at the location at which the BRB has been measured.

In some embodiments, the using as illustrated in step S303 comprises using the at least one identified RB if a distance between the current location of the MR node and the measurement location is within a predetermined distance. Because the MR in the HST is traveling upon a rail track and its location keeps changing, it should constantly determine whether it approximately reaches or is close to the location of the BRBs. Once the distance between the MR and some of the BRBs is within a predetermined range, the MR would apply these BRBs to communicate with the HUEs.

In some embodiments, the method 300 sends, prior to the receiving as illustrated in step S302, a request to the BS for a needed number of the BRBs which is determined by the MR node based upon QoS of the at least one HUE. In this manner, the MeNB may only convey information regarding the needed number of the BRBs to the MR node, and abandon those BRBs that are not suitable for use by the MR, for example, those having relatively further distance from the MR node than others.

Figure 4:
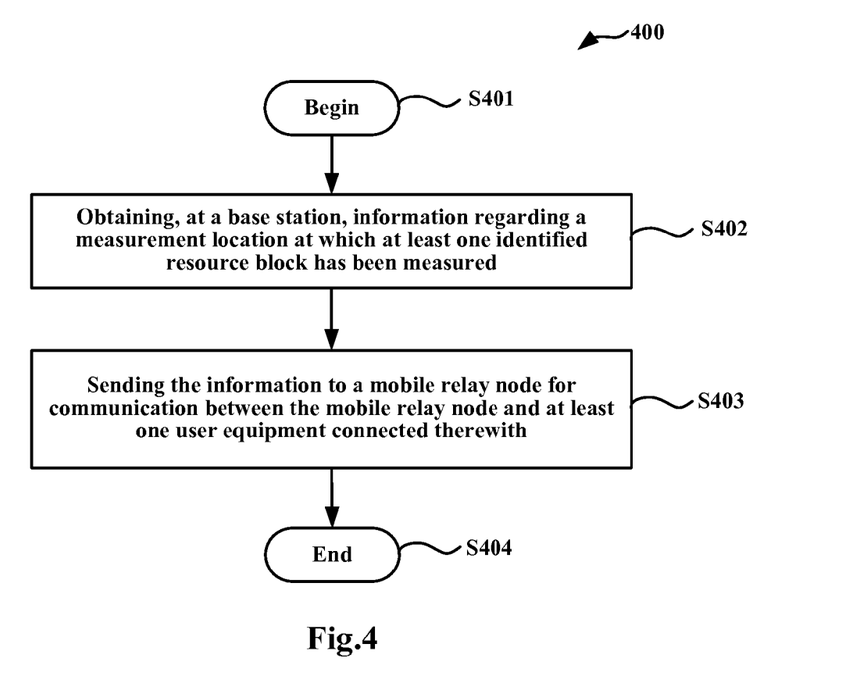
FIG. 4 is a flow chart schematically illustrating a method for allocation of RBs from a BS (or MeNB) perspective according to another embodiment of the present invention.

FIG. 4 is a flow chart schematically illustrating a method 400 for allocation of RBs from a BS (or MeNB) perspective according to another embodiment of the present invention. As illustrated in FIG. 4, the method 400 begins at step S401, and advances to step S402, at which the method 400 obtains, at a BS, information regarding a measurement location at which at least one identified RB has been measured. Following obtaining of the information regarding the measurement location, the method 400 proceeds to step S403, at which the method 400 sends the information to an MR node for communication between the MR node and at least one UE connected therewith (i.e., an HUE). Finally, the method 400 ends at step S404. As noted previously, the at least one identified RB is not used for communication between the BS (i.e., the MeNB) and at least one UE connected therewith (i.e., the MUE) at the measurement location and a measurement of the at least one identified RB is below a predetermined threshold (i.e., the BRB).

Although not shown in FIG. 4, the obtaining as illustrated in step S402 may comprise receiving the information from the at least one UE connected with the BS or at least one deployed sensor in proximity to a rail track which is covered by the BS and upon which an HSR vehicle travels, and the MR node and the at least one UE connected therewith are within the HSR vehicle (e.g., an HST). In some embodiments, based upon the instructions from the MeNB, the MUEs, especially those that are in idle states and within a predetermined distance from the HSR, would measure the channel state in the whole system bandwidth and ferret out BRBs whose measurements are below a predetermined threshold. In this manner, idle MUEs which are far away from the HSR would not carry out measurements and thus the power thereof could be saved.

Generally speaking, these embodiments can be advantageously applied to systems including a TDD-LTE system since the MUEs in these system are able to measure and find BRBs in both UL and DL directions. However, things are a little different for a FDD-LTE system because the MUEs in the FDD-LTE system cannot measure and locate the BRBs in the UL direction. In view of this, in some embodiments, in the obtaining as illustrated in step S402, the method 400 receives, at the BS, a reference signal and location information of the at least one UE connected with the BS and in proximity to a rail track which is covered by the BS and upon which an HSR vehicle travels. Upon receipt of the reference signal and the location information, the method 400 performs, based upon the received reference signal, a channel measurement throughout UL system bandwidth and determines, based upon the channel measurement, the at least one identified RB which is below the predetermined threshold (i.e., a BRB) and then sends the information to the MR node for UL transmission between the MR node and the at least one UE connected therewith.

In some embodiments, a number of the RBs is preset or determined according to a request from the MR node. In yet some embodiments, the method 400 allocates, if the number of the RBs less than as requested by the MR node, to the MR node one or more RBs that are orthogonal to the BS. In other words, when the BRBs are not enough for use by the MR node, MeNB would still allocate additional RBs to the MR node to ensure that no interference may arise.

In some embodiments, wherein the at least one identified RB is used by the MR node other than the BS for UL transmission or is used by the MR node other than the BS for DL transmission. Because the MeNB and MR node use separate or different RBs in their UL or DL transmission, the interference that may arise among these RBs could be efficiently avoided and eliminated.

The foregoing has discussed some exemplary embodiments of the present invention from MeNB and MR node perspectives in connection with FIGS. 3 and 4. For a better understanding of the present invention, reference will be made to FIG. 5, which shows a flow chart schematically illustrating a process 500 for allocation of RBs for DL transmission according to an embodiment of the present invention.

Figure 5:
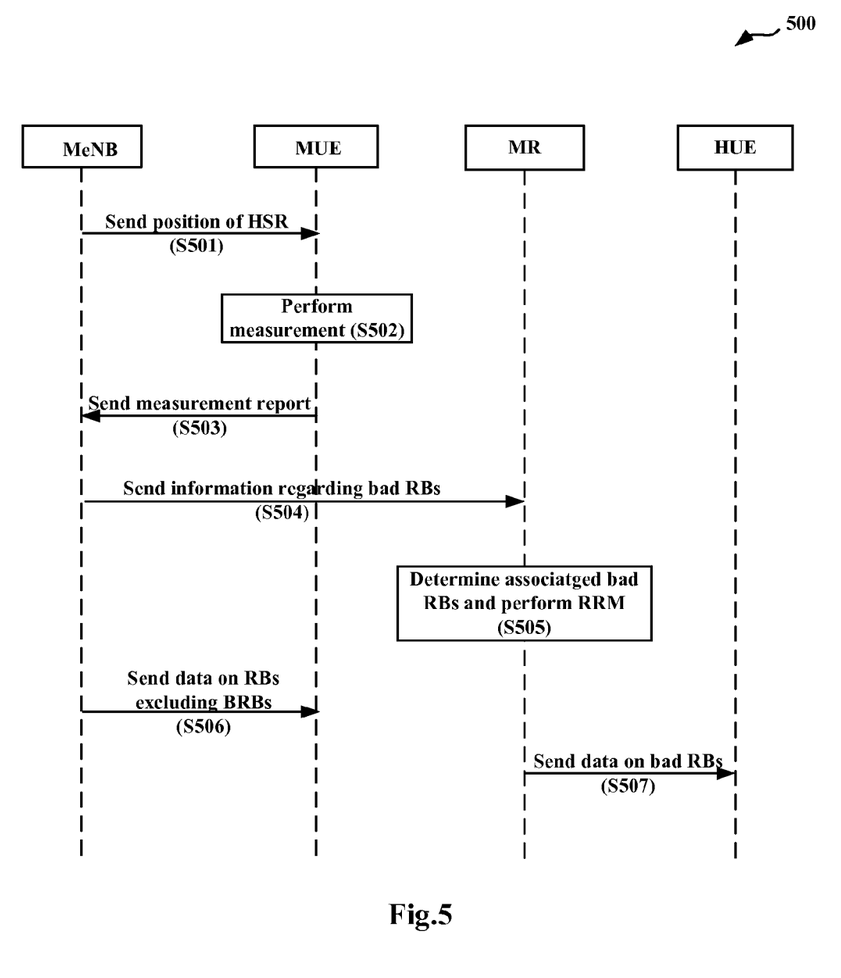
FIG. 5 is a flow chart schematically illustrating a process for allocation of RBs for DL transmission according to an embodiment of the present invention.

As illustrated in FIG. 5, the process 500 begins at step S501, at which an MeNB send position or location information of an HSR within its coverage to one or more connected MUEs, although only one shown for simplicity. For example, the MeNB sends the signaling and location information of the HSR to all MUEs via a BCH and instruct the (idle) MUEs near to the HSR to carry out measurements on one or more RBs. As mentioned before, because it is easy to determine its current location by e.g., an embedded GPS device, the MUE would be able to determine whether it is close to the HSR. Once the MUE determines it is close to the HSR, a measurement procedure would be triggered at step S502 on all BRs within the whole system bandwidth and BRBs which are below a predetermined threshold would be uncovered. Additionally or alternatively, if no MUEs are available to measure the BRs, then one or more sensors could be deployed along the rail track of the HSR and conduct the measurements.

Subsequent to measuring and determining the BRBs at step S502, the MUEs send, at step S503, to the MeNB measurement reports which may take forms as shown in the following table.

| RNTI of the MUE | Position | BRBs |
| --- | --- | --- |
| MUE 1 | (X1, Y1) | RB 1 |
| | | RB 2 |
| | | RB 3 |
| MUE 3 | (X3, Y3) | RB 5 |
| | | RB 6 |

It can be seen from the above table that the MUE 1 is close to the HSR with three BRBs (i.e., RB 1, RB 2, and RB 3) uncovered at the position of a coordinate (X1, Y1), which implies that received signals on these three RBs have very low power and have been subject to great attenuation. Likewise, with respect to the MUE 3, two BRBs (i.e., RB 5 and RB 6) are uncovered at the position of a coordinate (X3, Y3).

To decide how many BRBs are needed, in some embodiments, the MR may estimate a needed number of BRBs according to the QoS of the HUEs and then report this number to the MeNB. Then the MeNB may instruct the MUEs to report the specified number of BRBs. In yet other embodiments, to control signaling overhead, each MUE just reports the limited number of BRBs to the MeNB. If the MR needs more BRBs, it can require the MeNB to allocate the specific RBs which are orthogonal to those used by the MeNB. Because information regarding when the HSR reaches is available, these orthogonal RBs are just to be used for a limited time of period and thus will not engender low spectrum efficiency.

In some embodiments, upon receipt of the measurement report, the MeNB would apply data fusion techniques to the identified BRBs so as to avoid false alarms due to the shadowing fading of the MUEs. The data fusion techniques include, for example, AND, OR, and Majority rules. Take the AND rule as an example, an RB would be regarded as a BRB only if all the MUEs that are close to the HSR report this BR to the MeNB.

All things being equal, the MUE, at step S504, sends the information regarding the BRBs to the MR node. Upon receiving the information, the MR node determines, at step S505, which BRBs are associated therewith. The associated BRBs are BRBs that have the same or similar distances to the MR node. For example, RBs 1-3 as discussed previously would be considered as associated RBs since they have the same distance to the MR node. Following determination of the associated BRBs, the MR node performs the RRM such that it, at step S507, sends the data to the HUEs on these BRBs in a DL direction. Similarly, at step S506, the MeNB sends data to the MUEs on RBs excluding the BRBs in a DL direction.

Figure 6:
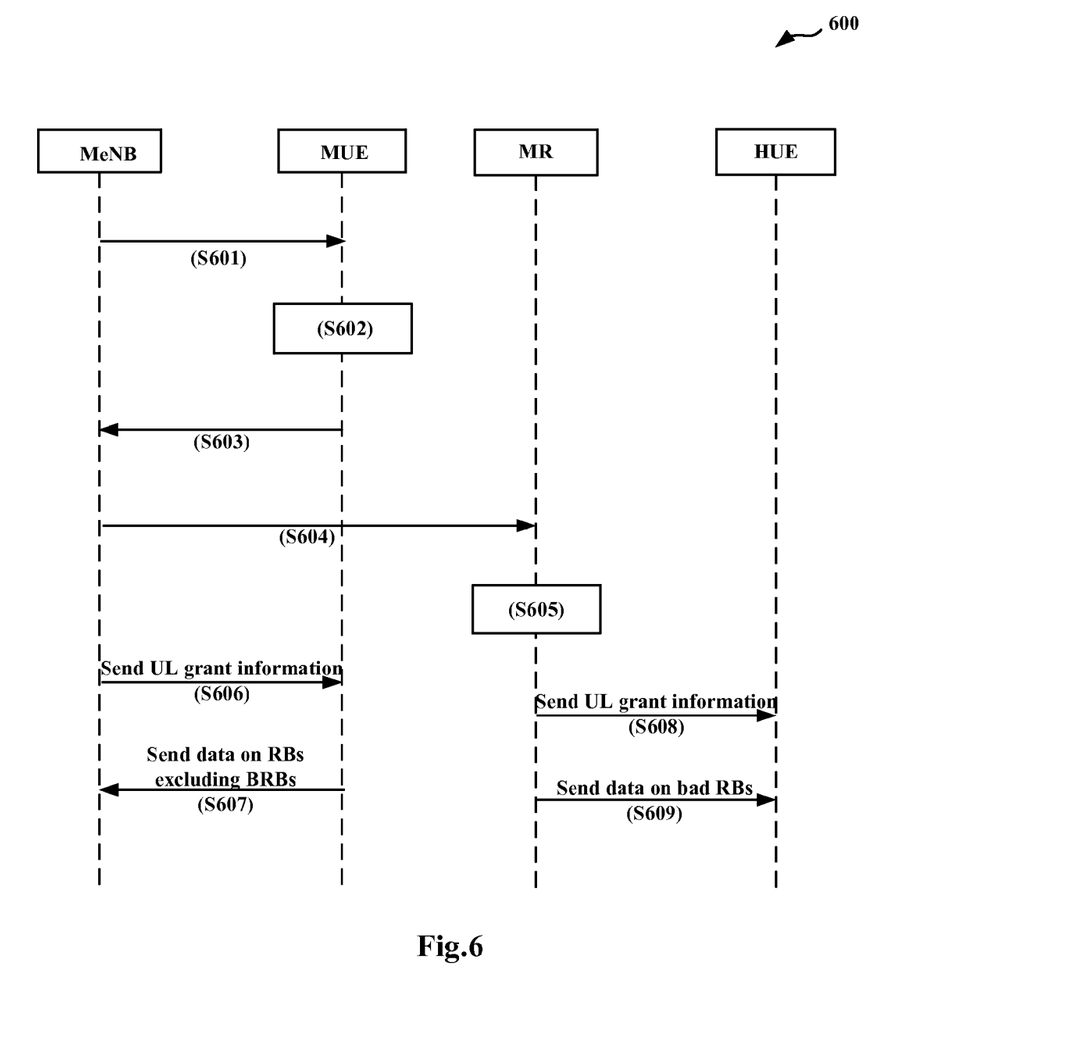
FIG. 6 is a flow chart schematically illustrating a process for allocation of RBs for UL transmission according to another embodiment of the present invention.

FIG. 6 is a flow chart schematically illustrating a process 600 for allocation of RBs for UL transmission according to another embodiment of the present invention. Because steps S601-S605 are identical to steps S501-S505 as illustrated in the process 500, the description directed to these steps is omitted herein for simplicity. Different from DL transmission, the MeNB sends, at step S606, the UL grant information to the MUE and thereafter the MUEs may send, at step S607, data on the RBs excluding the BRBs based upon the UL grant information. Likewise, the MR node may also send, at step S608, the UL grant information to the HUE and thereafter the HUE may send, at step S609, data on the BRBs based upon the UL grant information.

It should be noted that the above discussion in connection with the processes 500 and 600 are only exemplary and the scope of the present invention are not limited thereto.

Further, the processes 500 and 600 may involve further implemental details or have other variants. For example, as discussed previously, in an FDD LTE system, instead of receiving the measurement report from the MUE as illustrated in FIG. 5, the MeNB may measure and determine which BRs are BRBs on its own. In addition, it should be noted herein that the steps and execution order as illustrated FIGS. 5 and 6 are only examples and are not restrictive to the present invention. Those skilled in the art, after reading the present specification, can change these steps, for example, by omitting, combining, or adding certain steps, changing the execution order of certain steps so as to adapt to different application demands. For example, although steps S506 and S507 are shown in order, they can be performed concurrently.

Figure 7:
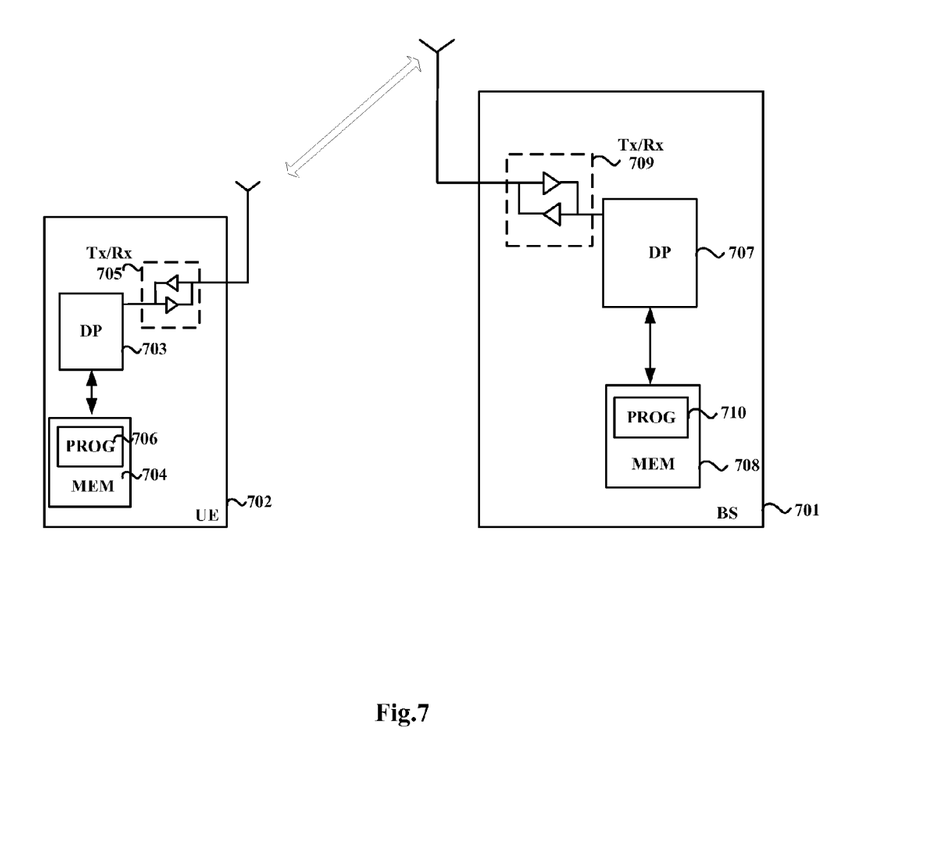
FIG. 7 is a schematic block diagram of a BS and a UE that are suitable for use in practicing the exemplary embodiments of the present invention.

FIG. 7 illustrates a simplified block diagram of a BS 701 and a UE 702 that are suitable for use in practicing the exemplary embodiments of the present invention. In FIG. 7, a wireless network is adapted for communication with the UE 702, which may be embodied as an MUE or HUE, via the BS (MeNB or MR node) 701. The UE 702 includes a data processor (DP) 703, a memory (MEM) 704 coupled to the DP 703, and a suitable RF transmitter TX and receiver RX 705 coupled to the DP 703. The MEM 704 stores a program (PROG) 707. The TX/RX 705 is for bidirectional wireless communications with the BS 701. Note that the TX/RX 705 has at least one antenna to facilitate communication; multiple antennas may be employed for multiple-input multiple-output MIMO communications in which case the UE 702 may have multiple TXs and/or RXs.

The BS 701 includes a data processor (DP) 707, a memory (MEM) 708 coupled to the DP 707, and a suitable RF transmitter TX and receiver RX 709 coupled to the DP 707. The MEM 708 stores a program (PROG) 710. The TX/RX 709 is for bidirectional wireless communications with the UE 702. Note that the TX/RX 709 has at least one antenna to facilitate communication, though in practice a BS will typically have several. The BS 701 may be coupled via a data path to one or more external networks or systems, such as the internet, for example.

At least one of the PROGs 706 and 710 is assumed to include program instructions that, when executed by the associated DPs 703 and 707, enable the UE 702 and BS 701 to operate in accordance with the exemplary embodiments of this invention, as discussed herein with the methods 300, 400 and the processes 500 and 600 under wireless communication environments as shown in FIGS. 1 and 2.

The MEMs 704 and 708 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the BS 701 or UE 702, there may be several physically distinct memory units in the BS 701 or UE 702.

The DPs 703 and 707 may be of any type suitable to the local technical environment, and may include one or more of general purpose computers, special purpose computers, microprocessors, DSPs and processors based on multicore processor architecture, as non limiting examples. Either or both of the UE 702 and the BS 701 may have multiple processors, such as for example an application specific integrated circuit chip that is slaved in time to a clock which synchronizes the main processor.

In general, the various embodiments of the UE 702 can include, but are not limited to, cellular phones, PDAs having wireless communication capabilities, portable computers having wireless communication capabilities, image capture devices such as digital cameras having wireless communication capabilities, gaming devices having wireless communication capabilities, as well as portable units or terminals that incorporate combinations of such functions.

The embodiments of the present invention may be implemented by computer software executable by one or more of the DPs 703, 707 of the UE 702 and the BS 701, or by hardware, or by a combination of software and hardware.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for allocation of resource blocks, comprising:
   receiving, by a mobile relay node, from a base station, information regarding a measurement location at which at least one identified resource block has been measured; and
   using, based upon a current location of the mobile relay node and the measurement location, the at least one identified resource block for communication between the mobile relay node and at least one user equipment connected with the mobile relay node,
   wherein the at least one identified resource block is not used for communication between the base station and at least one user equipment connected with the base station at the measurement location and a signal power of the at least one identified resource block measured by the at least one user equipment connected with the base station is below a predetermined threshold.

2. The method as recited in claim 1, wherein the using comprises:

using the at least one identified resource block if a distance between the current location of the mobile relay node and the measurement location is within a predetermined distance.

3. The method as recited in claim 2, wherein the mobile relay node and the at least one user equipment connected with the mobile relay node are located in a high speed railway vehicle and the measurement location is in proximity to a rail track which is covered by the base station and upon which the high speed railway vehicle travels.

4. The method as recited in claim 1, further comprising:
sending, prior to the receiving, a request to the base station for a needed number of the resource blocks which is determined by the mobile relay node based upon quality of service of the at least one user equipment connected with the mobile relay node.

5. The method as recited in claim 1, wherein the at least one identified resource block is used by the mobile relay node other than the base station for uplink transmission or is used by the mobile relay node other than the base station for downlink transmission.

6. A method for allocation of resource blocks, comprising:
obtaining, by a base station, information regarding a measurement location at which at least one identified resource block has been measured;
sending, by the base station, the information to a mobile relay node for communication between the mobile relay node and at least one user equipment connected with the mobile relay node; and
using, based upon a current location of the mobile relay node and the measurement location, the at least one identified resource block for communication between the mobile relay node and the at least one user equipment connected with the mobile relay node,
wherein the at least one identified resource block is not used for communication between the base station and at least one user equipment connected with the base station at the measurement location and a signal power of the at least one identified resource block measured by the at least one user equipment connected with the base station is below a predetermined threshold.

7. The method as recited in claim 6, wherein the obtaining the information comprises:
receiving the information from the at least one user equipment connected with the base station or at least one deployed sensor in proximity to a rail track which is covered by the base station and upon which a high speed railway vehicle travels, and the mobile relay node and the at least one user equipment connected with the mobile relay node are within the high speed railway vehicle.

8. The method as recited in claim 6, wherein a number of the resource blocks is preset or determined according to a request from the mobile relay node.

9. The method as recited in claim 8, further comprising:
allocating, if the number of the resource blocks is less than as requested by the mobile relay node, to the mobile relay node one or more resource blocks that are orthogonal to the base station.

10. The method as recited in claim 6, wherein the at least one identified resource block is used by the mobile relay node other than the base station for uplink transmission or is used by the mobile relay node other than the base station for downlink transmission.

11. A method for allocation of resource blocks, comprising:

obtaining, at a base station, information regarding a measurement location at which at least one identified resource block has been measured; and
sending the information to a mobile relay node for communication between the mobile relay node and at least one user equipment connected therewith,
wherein the at least one identified resource block is not used for communication between the base station and at least one user equipment connected therewith at the measurement location and a measurement of the at least one identified resource block is below a predetermined threshold, wherein the obtaining the information comprises:
receiving, at the base station, a reference signal and location information of the at least one user equipment connected with the base station and in proximity to a rail track which is covered by the base station and upon which a high speed railway vehicle travels;
performing, based upon the received reference signal, a channel measurement throughout uplink system bandwidth;
determining, based upon the channel measurement, the at least one identified resource block of which signal power is below the predetermined threshold; and
sending the information to the mobile relay node for uplink transmission between the mobile relay node and the at least one user equipment connected therewith.

12. An apparatus for allocation of resource blocks, comprising:
a processor; and
a memory storing executable instructions that, when executed by the processor, cause the processor to:
receive, by a mobile relay node, from a base station, information regarding a measurement location at which at least one identified resource block has been measured; and
use, based upon a current location of the mobile relay node and the measurement location, the at least one identified resource block for communication between the mobile relay node and at least one user equipment connected with the mobile relay node,
wherein the at least one identified resource block is not used for communication between the base station and at least one user equipment connected with base station at the measurement location and a signal power of the at least one identified resource block measured by the at least one user equipment connected with the base station is below a predetermined threshold.

13. The apparatus as recited in claim 12, wherein
the processor is further configured to use the at least one identified resource block if a distance between the current location of the mobile relay node and the measurement location is within a predetermined distance.

14. The apparatus as recited in claim 12, wherein the mobile relay node and the at least one user equipment connected with the mobile relay node are located in a high speed railway vehicle and the measurement location is in proximity to a rail track which is covered by the base station and upon which the high speed railway vehicle travels.

15. The apparatus as recited in claim 12,
wherein the processor is further configured to send, prior to the receiving, a request to the base station for a needed number of the resource blocks which is determined by the mobile relay node based upon quality of service of the at least one user equipment connected with the mobile relay node.

16. The apparatus as recited in claim 12, wherein the at least one identified resource block is used by the mobile relay node other than the base station for uplink transmission or is used by the mobile relay node other than the base station for downlink transmission.

17. An apparatus for allocation of resource blocks, comprising:
a processor; and
a memory storing executable instructions that, when executed by the processor, cause the processor to:
obtain, by a base station, information regarding a measurement location at which at least one identified resource block has been measured; and
send the information from the base station to a mobile relay node for communication between the mobile relay node and at least one user equipment connected with the mobile relay node,
wherein the at least one identified resource block is used for communication between the mobile relay node and the at least one user equipment connected with the mobile relay node based upon a current location of the mobile relay node and the measurement location, and
wherein the at least one identified resource block is not used for communication between the base station and at least one user equipment connected with the base station at the measurement location and a signal power of the at least one identified resource block measured by the at least one user equipment connected with the base station is below a predetermined threshold.

18. The apparatus as recited in claim 17, wherein
the processor is further configured to receive the information from the at least one user equipment connected with the base station or at least one deployed sensor in proximity to a rail track which is covered by the base station and upon which a high speed railway vehicle travels, and the mobile relay node and the at least one user equipment connected therewith are within the high speed railway vehicle.

19. The apparatus as recited in claim 17, wherein a number of the resource blocks is preset or determined according to a request from the mobile relay node.

20. The apparatus as recited in claim 19,
wherein the processor is further configured to allocate, if the number of the resource blocks is less than as requested by the mobile relay node, to the mobile relay node one or more resource blocks that are orthogonal to the base station.

21. The apparatus as recited in claim 17, wherein the at least one identified resource block is used by the mobile relay node other than the base station for uplink transmission or is used by the mobile relay node other than the base station for downlink transmission.

22. An apparatus for allocation of resource blocks, comprising:
a processor; and
a memory storing executable instructions that, when executed by the processor, cause the processor to;
obtain, at a base station, information regarding a measurement location at which at least one identified resource block has been measured; and
send the information to a mobile relay node for communication between the mobile relay node and at least one user equipment connected therewith,
wherein the at least one identified resource block is not used for communication between the base station and at least one user equipment connected therewith at the measurement location and a measurement of the at least one identified resource block is below a predetermined threshold, wherein the processor is further configured to:
receive, at the base station, a reference signal and location information of the at least one user equipment connected with the base station and in proximity to a rail track which is covered by the base station and upon which a high speed railway vehicle travels;
perform, based upon the received reference signal, a channel measurement throughout uplink system bandwidth;
determine, based upon the channel measurement, the at least one identified resource block of which signal power is below the predetermined threshold; and
send the information to the mobile relay node for uplink transmission between the mobile relay node and the at least one user equipment connected therewith.

* * * * *